(12) United States Patent
Kato et al.

(10) Patent No.: US 7,744,787 B2
(45) Date of Patent: *Jun. 29, 2010

(54) ANOMALY MONITORING METHOD OF AN INJECTION MOLDING MACHINE

(75) Inventors: Toshimi Kato, Nagano-ken (JP); Takashi Hakoda, Nagano-ken (JP); Masaki Miyazaki, Nagano-ken (JP)

(73) Assignee: Nissei Plastic Industrial Co., Ltd., Hanishina-Gun, Nagano-Ken (JP)

( * ) Notice: Subject to any disclaimer, the term of this patent is extended or adjusted under 35 U.S.C. 154(b) by 124 days.

This patent is subject to a terminal disclaimer.

(21) Appl. No.: 11/896,761

(22) Filed: Sep. 5, 2007

(65) Prior Publication Data

US 2008/0065356 A1    Mar. 13, 2008

(30) Foreign Application Priority Data

Sep. 12, 2006    (JP)    ............................. 2006-246363

(51) Int. Cl.
*B29C 45/52* (2006.01)

(52) U.S. Cl. .................... 264/40.1; 264/328.1; 425/136; 425/145

(58) Field of Classification Search ............... 264/40.1, 264/40.5, 40.7, 328.1; 425/145–148, 136
See application file for complete search history.

(56) References Cited

U.S. PATENT DOCUMENTS 5,153,149 A * 10/1992 Naito et al. .................. 425/136
2004/0142056 A1 * 7/2004 Watanabe et al. ........... 425/145
2006/0278014 A1 * 12/2006 Okada et al. .................. 73/824

FOREIGN PATENT DOCUMENTS

| JP | 63-227316 | A | 9/1988 |
| JP | 2-169224 | * | 6/1990 |
| JP | 11-240052 | A | 9/1999 |
| JP | 2002-248665 | * | 9/2002 |

* cited by examiner

*Primary Examiner*—Jill L Heitbrink
(74) *Attorney, Agent, or Firm*—Birch, Stewart, Kolasch & Birch, LLP

(57) ABSTRACT

In monitoring anomalies in a measurement process comprising a main measurement process Sa which performs a measurement by forward rotating a screw 3 having a back-flow prevention valve 2 installed on the tip and a post-measurement process which performs a post-measurement process Sb for closing said back-flow prevention valve 2 after this main measurement process Sa ends, after said post-measurement process Sb ends, an injection process Si wherein said screw 3 is put in a freely-rotatable state and moved forward is performed, the amount of rotation Rd of said screw 3 since the start of this injection process Si is detected, and if the detected amount of rotation Rd exceeds at least a preset amount Rs, an anomaly processing (S9) is performed.

16 Claims, 5 Drawing Sheets

ANOMALY MONITORING METHOD OF AN INJECTION MOLDING MACHINE

BACKGROUND OF THE INVENTION

1. Field of the Invention

The present invention relates to an anomaly monitoring method of an injection molding machine that can monitor anomaly in closing a back-flow prevention valve after performing measurements with a screw having a back-flow prevention valve installed.

2. Description of the Relevant Art

In general, an inline screw injection molding machine prevents back flow of molten resin at the time of injection by installing a back-flow prevention valve (ring valve) at the tip of the screw. In addition, a conventional practice in this kind of injection molding machine is to forcibly close the back-flow prevention valve by reverse rotating the screw by a tiny number of rotations (angle of rotation) after performing measurements by rotating (forward rotating) the screw.

For example, disclosed in Japanese Unexamined Patent Application No. 11 (1999)-240052 is an operation method of an inline injection molding machine wherein the amount of measured molten mix-kneaded resin to be injected is prevented from varying the amount at the time of suck back or injection, reducing the scatter in the amount of filling. In this operation method, after finishing the measurement of molten mix-kneaded resin stored in the tip of a heating cylinder, the screw is rotated in reverse to move a check ring until it makes contact with a check sheet, closing a resin path formed between the check ring and the check sheet, and afterwards a suck-back process is performed.

On the other hand, in normal injection molding, because measured resin includes a cushion amount, the amount of filling can be supplemented by adding a dwell pressure even if the amount of resin or density may somewhat change, providing a good product in the case of a general-use product or a molded product for which precision is not strictly demanded. However, in recent years, a high level of molding precision has come to be demanded due to miniaturization and higher precision of molded products. For example, a narrow pitch connector of several millimeters in size needs to be formed only by a filling process with no dwell pressure added in order to prevent deformation of an inserted connector pin, and in a thin optical disk formed by injection compressed molding, because the amount of filled resin directly causes unevenness of the thickness of the disk, a constant amount of resin always needs to be supplied to a cavity. Therefore, in forming such a precision molded product, securing a precise amount of filling (amount of resin) is always required, important in securing a precise amount of filling whether a back-flow prevention valve is completely closed or not. If closure is incomplete, back flow of resin occurs, and even if such back flow is a tiny amount, it will immediately cause scatter in the amount of filling.

In this manner, in forming a precision molded product, it is important to precisely monitor the closed state of a back-flow prevention valve. An injection molding machine which can check such closed state of a back-flow prevention valve is disclosed known in Japanese Unexamined Patent Application No. 63 (1988)-227316, which comprises an injection molding machine equipped with a back-flow prevention valve at the screw tip inside a heating cylinder, constituted by providing a communication means inside the screw which communicates a position change accompanying the opening/closing of the back-flow prevention valve to the outside, and a position detection means in rear of the screw which detects the position change communicated by the communication means.

However, the conventional injection molding machines which monitor (checks) the closed state of the back-flow prevention valve had the following problems.

First, because its construction comprises a communication means which communicates the position change of the back-flow prevention valve to the outside and a position detection means which detects the position change communicated by the communication means, there are many mechanical communication mechanisms, which limit precision in detecting a tiny displacement of the back-flow prevention valve, making if impossible to perform highly reliable or stable monitoring of whether the back-flow prevention valve is completely closed or not.

Second, because it requires the communication means inside the screw and the position detection means in rear of the screw, its structure becomes intricate and complex, with significant cost increase and scale increase accompanying the parts cost and manufacturing cost.

SUMMARY OF THE INVENTION

The objective of the present invention is to provide an anomaly monitoring method of an injection molding machine which can perform highly reliable and stable monitoring as to whether a back-flow prevention valve is completely closed or not by more directly detecting the open/close state of the back-flow prevention valve.

Another objective of the present invention is to provide an anomaly monitoring method of an injection molding machine which can achieve a large cost reduction on parts cost and manufacturing cost and contribute to the miniaturization of the whole molding machine by facilitating the implementation and simplification of the structure through eliminating the need of conventional separate structures such as a communication means inside a screw and a position detection means in the rear of the screw.

In order to achieve these objectives, the anomaly monitoring method of an injection molding machine relating to the present invention is characterized by the fact that, in monitoring anomalies in the measurement process comprising a main measurement process which performs a measurement by forward rotating a screw having a back-flow prevention valve installed on the tip and a post-measurement process which performs a post-measurement process for closing said back-flow prevention valve after the main measurement process ends, after said post-measurement process ends, an injection process wherein said screw is put in a freely-rotatable state and moved forward is performed, the amount of rotation of said screw since the start of this injection process is detected, and if the detected amount of rotation exceeds at least a preset amount, anomaly processing is performed.

BRIEF DESCRIPTION OF THE DRAWINGS

FIG. 4 (b) is an action explanatory diagram showing the following screw state in FIG. 4 (a) when implementing the anomaly monitoring method.

FIG. 4 (c) is an action explanatory diagram showing the following screw state in FIG. 4 (b) when implementing the anomaly monitoring method.

FIG. 4 (d) is an action explanatory diagram showing the following screw state in FIG. 4 (c) when implementing the anomaly monitoring method.

FIG. 4 (e) is an action explanatory diagram showing the following screw state in FIG. 4 (d) when implementing the anomaly monitoring method.

DETAILED DESCRIPTION OF THE PREFERRED EMBODIMENT

A preferred embodiment relating to the present invention is explained in detail hereafter based on drawings. Note that the attached drawings do not specify the present invention but facilitate an understanding of the present invention. In addition, detailed explanations are omitted regarding commonly-known parts in order to prevent the invention from becoming ambiguous.

Figure 3:
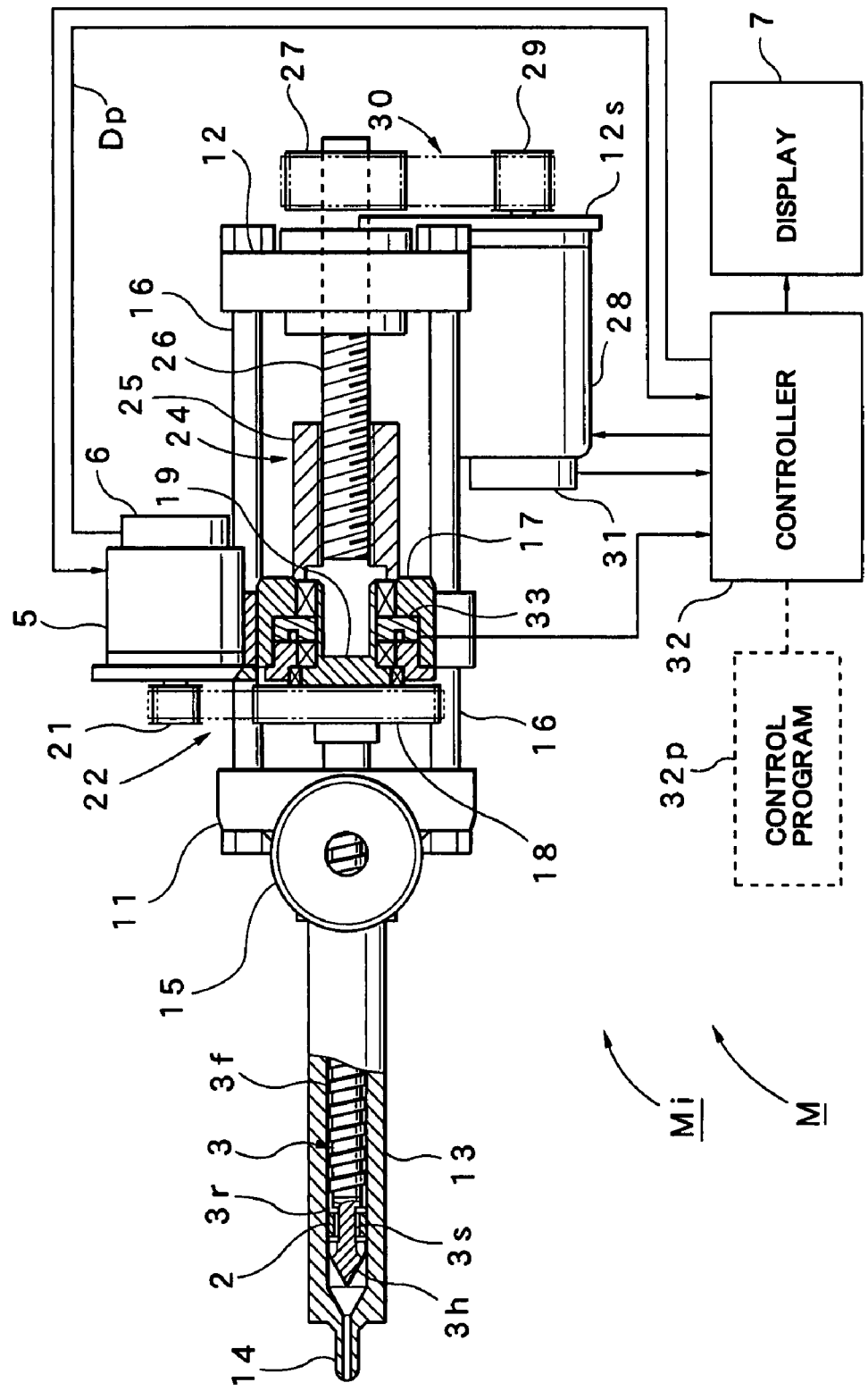
FIG. 3 is a partial cross-sectional plan view of an injection molding machine wherein the anomaly monitoring method can be implemented.
Figure 4:
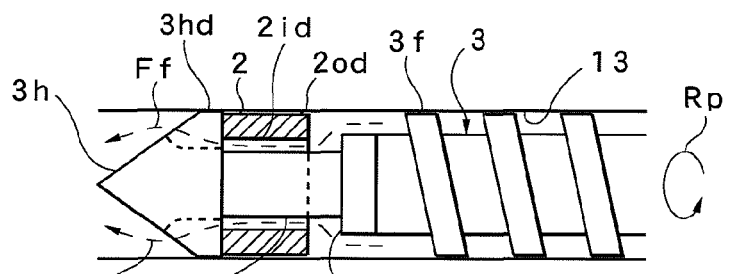
FIG. 4 (a) is an action explanatory diagram showing the screw state when implementing the anomaly monitoring method.
Figure 4:
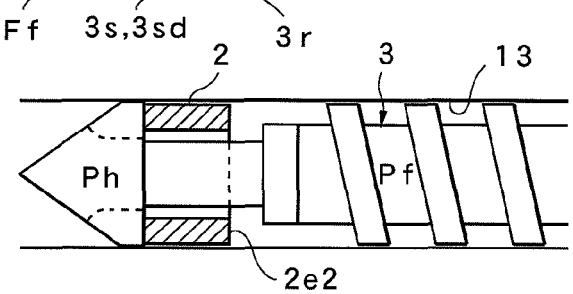
Figure 4:
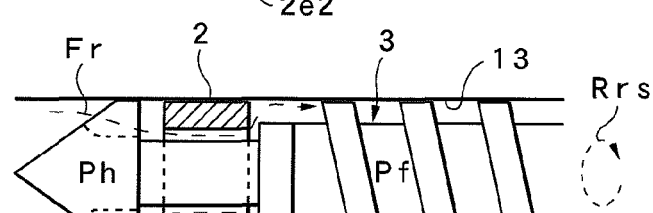
Figure 4:
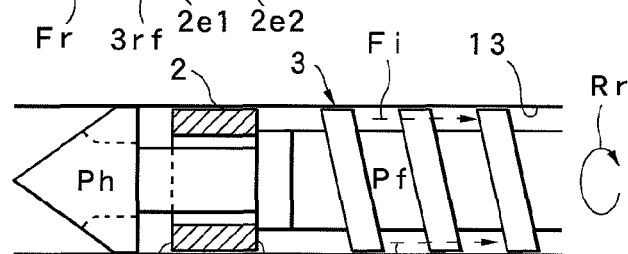
Figure 4:
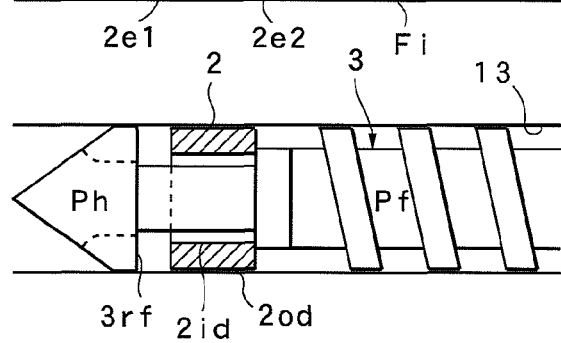

First of all, the construction of an injection molding machine M wherein the anomaly monitoring method relating to the present embodiment can be implemented is explained referring to FIG. 3 and FIG. 4 (a).

Of the injection molding machine M shown in FIG. 3, only an injection device Mi excluding a locking device is shown. The injection device Mi is equipped with an injection platform 11 and a driving platform 12 which are apart from each other, wherein the rear end of a heating cylinder 13 is supported by the front face of this injection platform 11. The heating cylinder 13 is equipped with an injection nozzle 14 at the front end, and a hopper 15 at the rear end which supplies a molding material into the heating cylinder 13, wherein a screw 3 is inserted in the heating cylinder 13.

This screw 3 is equipped with a ring valve (back-flow prevention valve) at the tip. As shown expanded in FIG. 4 (a), the screw 3 has a cone-shape screw head 3h having a pointed tip at the very tip and has a valve mounting axis unit 3s of relatively a small outer diameter 3sd between the screw head 3h and a flight 3f side, wherein a cylinder-shape ring valve 2 having an inner diameter 2id which is larger than the small outer diameter 3sd is mounted freely displaceable on this valve mounting axis unit 3s. Thus, the ring valve 2 becomes freely slidable over a specified stroke along the axis direction (front-rear direction) of the valve mounting axis unit 3s, wherein the resin path from the flight 3f side to the screw head 3h side is blocked if the ring valve 2 retracts and makes contact with a valve seat 3r formed in the flight 3f side, and the resin path is released if the ring valve 2 proceeds and leaves the valve seat 3r. In this case, the fact that the rein path is blocked has the same meaning as the fact that the ring valve 2 is closed.

On the other hand, four tie bars 16 are installed between the injection platform 11 and the driving platform 12, and a sliding block 17 is mounted freely slidable on the tie bars 16. A rotary block 19 having a driven wheel 18 integrated is supported freely rotatable at the front end of the sliding block 17, and the rear end of the screw 3 is connected to the center of this rotary block 19. In addition, a screw rotation servomotor (electric motor) 5 is mounted to the side face of the sliding block 17, and a driving wheel 21 fixed to the rotation shaft of this servomotor 5 connects to the driven wheel 18 via a rotation transmission mechanism 22. This rotation transmission mechanism 22 may be a gear transmission mechanism using a transmission gear or a belt transmission mechanism using a timing belt. Further, a rotary encoder 6 to detect the rotation rate (number of rotations) of this servomotor 5 is added to the servomotor 5.

On the other hand, a ball screw mechanism 24 is constructed by integrating a nut unit 25 coaxially to the rear the sliding block 17 and screwing the front side a ball screw unit 26 supported freely rotatable to the driving platform 12 into the nut unit 25. In addition, a driven wheel 27 is attached to the rear end of a ball screw unit 26 projecting backward from the driving platform, a screw movement servomotor (electric motor) 28 is attached to a supporting disk 12s attached to the driving platform 12, and a driving wheel 29 fixed to the rotation shaft of this servomotor 28 connects to the driven wheel 27 via a rotation transmission mechanism 30. The rotation transmission mechanism 30 may be a gear transmission mechanism using a transmission gear or a belt transmission mechanism using a timing belt. Further, a rotary encoder 31 to detect the rotation rate (number of rotations) of this servomotor 28 is added to the servomotor 28.

In addition, 32 in FIG. 3 is a controller provided in the injection molding machine M, which can execute a series of controls (sequence control) in the anomaly monitoring method relating to the present embodiment by a stored control program 32p. On the other hand, said servomotors 5 and 28 and rotary encoders 6 and 31 are connected to the controller 32, and a load cell (pressure sensor) 33 set between the rotary block 19 and the sliding block 17 is connected. The pressure (resin pressure) received by the screw 3 can be detected by the load cell 33. Further, a display using a liquid crystal display and so on is connected to the controller 32.

Figure 1:
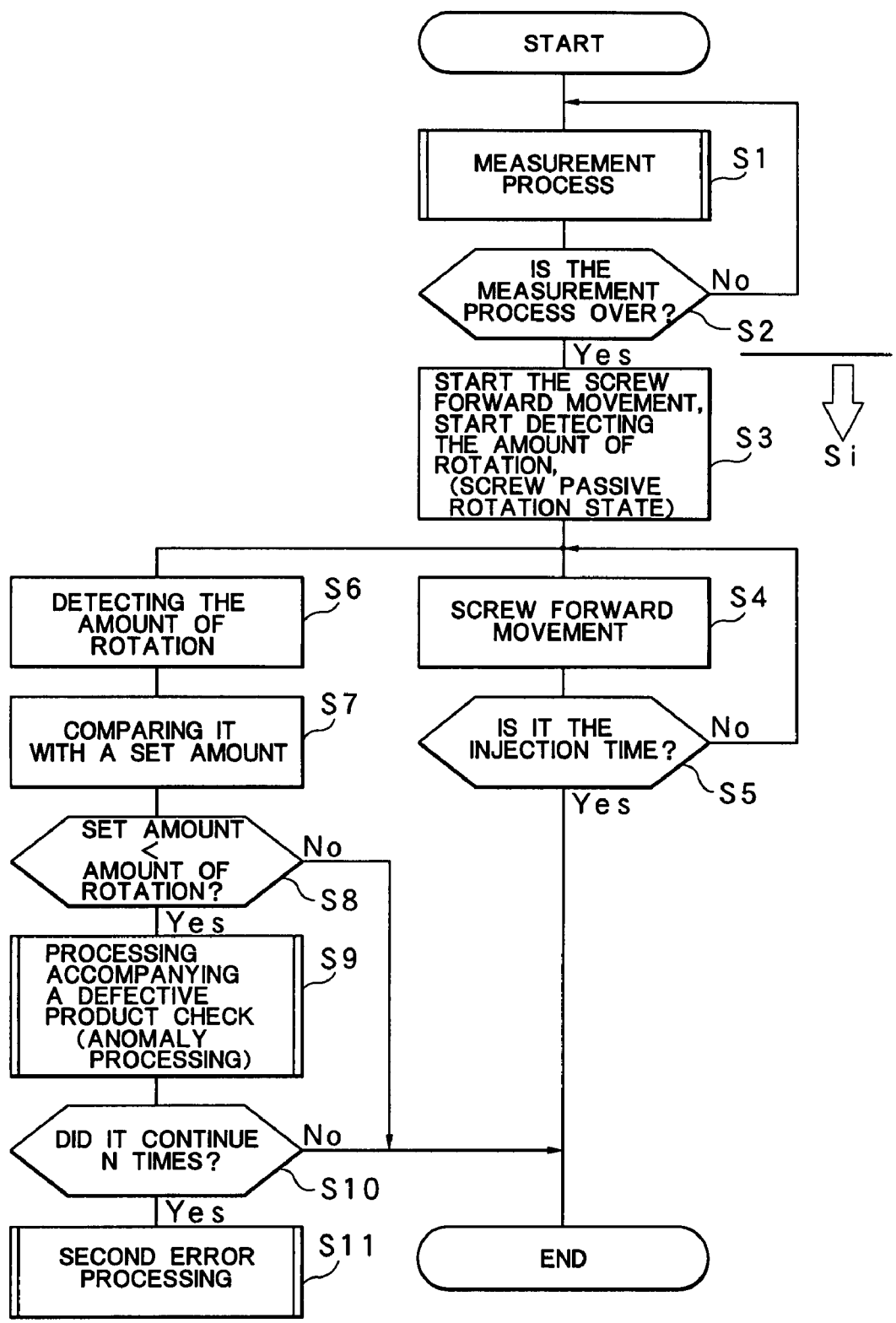
FIG. 1 is a flow chart showing the order of processing of the anomaly monitoring method of an injection molding machine relating to the best embodiment of the present invention.
Figure 2:
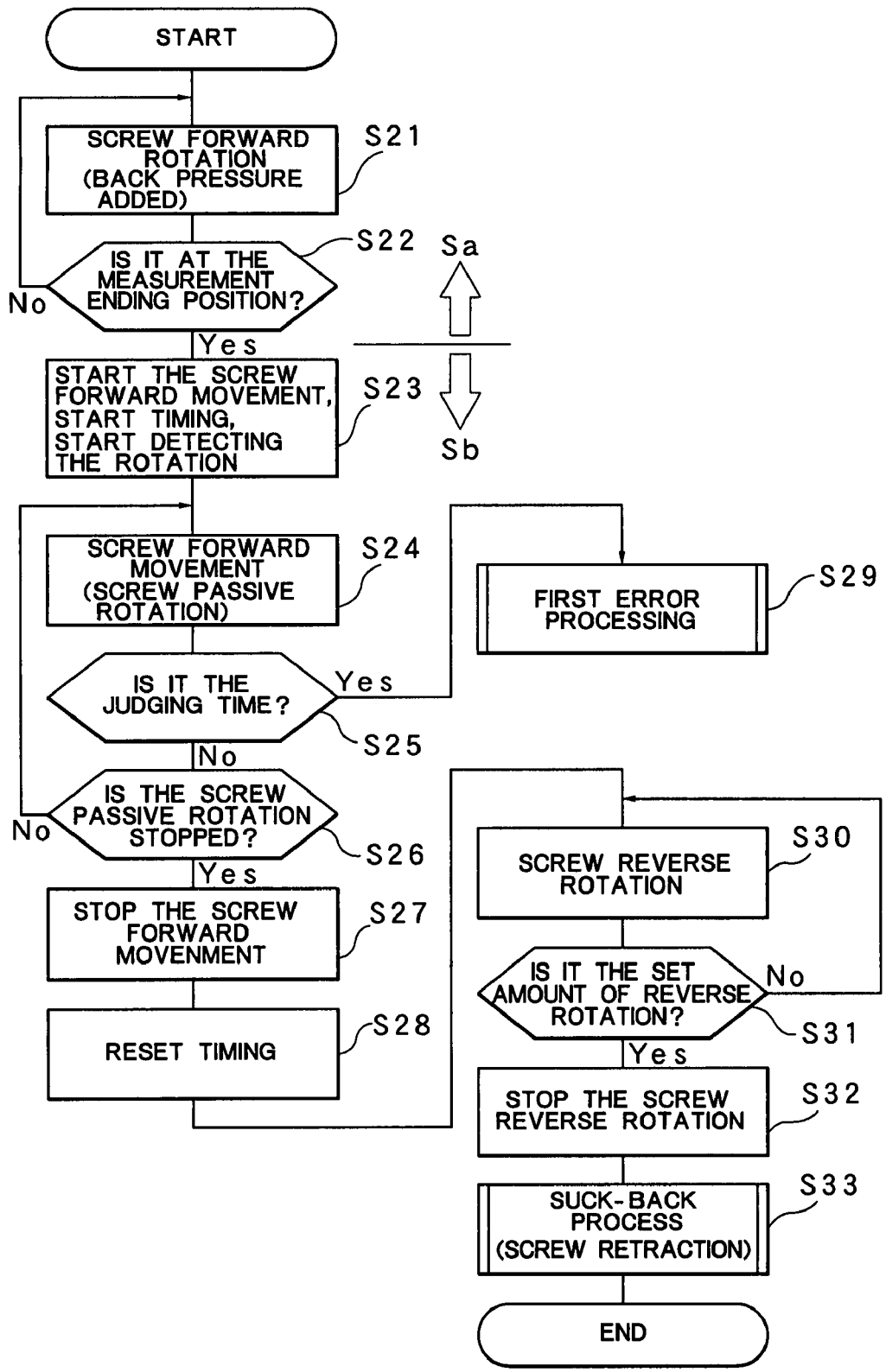
FIG. 2 is a flow chart showing the order of processing of the measurement process wherein the anomaly monitoring method is implemented.
Figure 5:
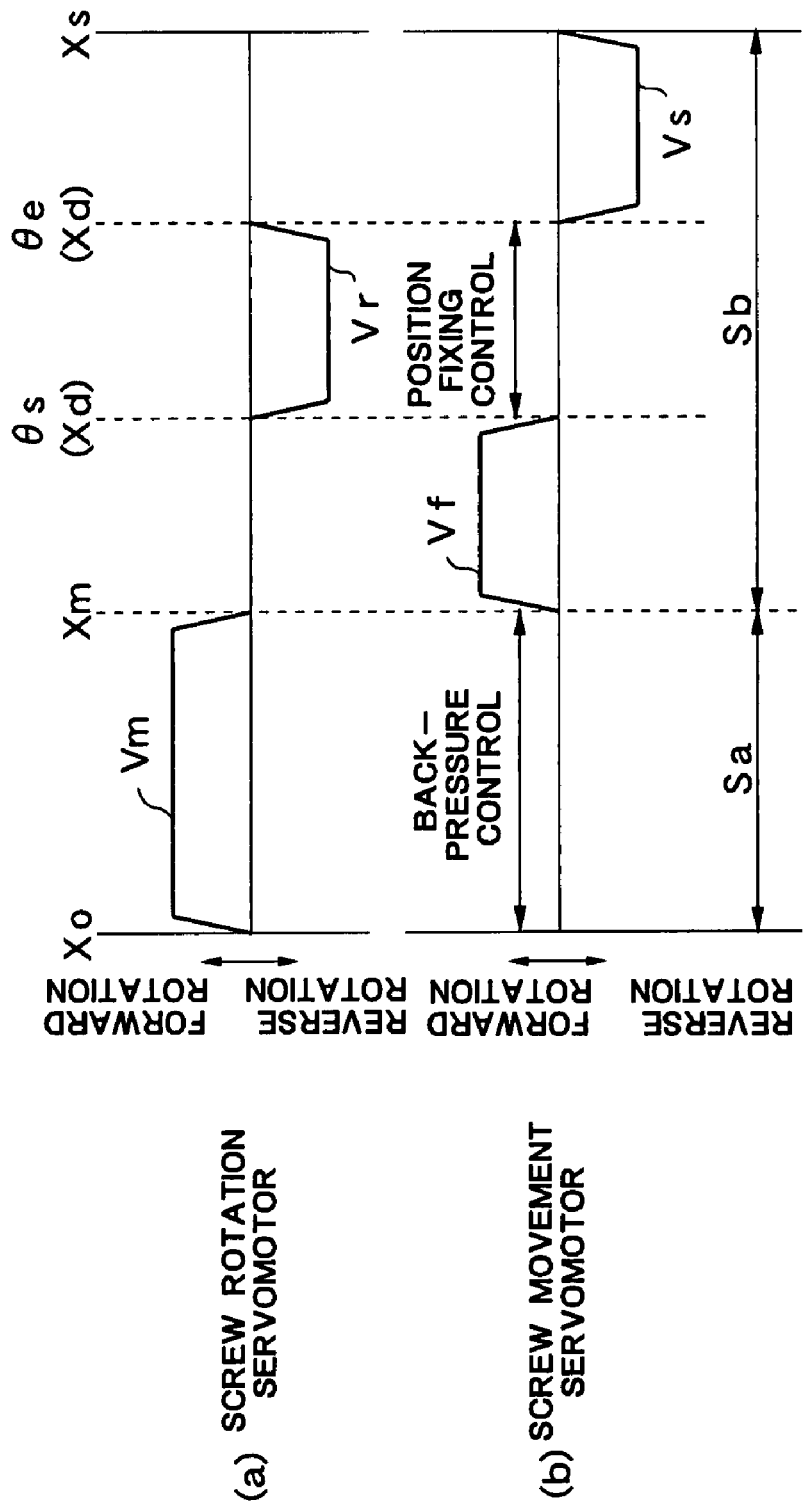
FIG. 5 is a timing chart showing the operation states of a screw rotation servomotor and a screw movement servomotor when implementing the anomaly monitoring method.

Next, an anomaly monitoring method relating to the present embodiment using such an injection molding machine M as this is explained according to flow charts shown in FIG. 1 and FIG. 2 referring to FIG. 3 through FIG. 5.

The anomaly monitoring method relating to the present embodiment detects anomalies in the measurement process, and especially detects in the injection process whether the ring valve 2 is completely closed in the measurement process or not.

First, the measurement process is performed (Step S1). The order of processing in the measurement process is explained according to a flow chart shown in FIG. 2. The measurement process comprises a main measurement process Sa and a post-measurement process Sb. First, the main measurement process Sa is performed. In the main measurement process Sa, the screw rotation servomotor 5 is driven (rate controlled) by the controller 32, transmitting the rotation of the servomotor 5 to the screw 3 via the rotation transmission mechanism 22, and by the screw 3 rotating forward, plasticized molten resin is measured and accumulated forward of the screw 3 inside the heating cylinder 13, corresponding to which the screw 3 retracts (Step S21). In addition, in the main measurement process Sa, back-pressure control for the screw 3 is performed by electrification controlling the screw movement servomotor 28 (Step S21). The operating state of (a) the screw rotation servomotor 5 and (b) the screw movement servomotor 28 is shown in FIG. 5 in the timing charts. In FIG. 5, Xo indicates a measurement starting position, and Vm the rotation rate of the screw rotation servomotor 5 in the main measurement process Sa. On the other hand, shown in FIG. 4 (a) is the screw 3 state in the main measurement process Sa, wherein an arrow Rp indicates the screw 3 rotation direction (forward rotation direction), and an arrow Ff the relative movement direction of the molten resin. FIGS. 4(a) to (d) illustrate the screw head 3h having flat, ring-shaped rear face 3rf, and the ring valve 2 having two flat, ring-shaped ends 2e1, 2e2 which are parallel to each other. FIGS. 4(a) to (d) also show the ring valve 2 having an outer diameter 2od which is substantially equal to an outer diameter 3hd of the flat, ring-shaped rear face 3rf of the screw head 3h.

By the screw 3 retracting to a preset measurement ending position Xm, the main measurement process Sa ends (Step S22). Shown in FIG. 4 (b) is the screw 3 state at the measurement ending position Xm, in which the resin pressure Pf in the flight 3f side relative to the ring valve 2 is higher than the resin pressure Ph in the screw head 3h side, namely Ph<Pf.

Proceeding to the post-measurement process Sb, in the post-measurement process Sb, first the screw 3 is moved forward until the ring valve 2 comes to a position (touching position) wherein it contacts with the valve seat 3r (Steps S23~S29). In this case, the screw 3 is switched to a freely-rotatable state wherein it can be passively rotated by an external force, and the screw movement servomotor 28 is driven by the controller 32. The driving control in this case becomes a rate control with a pressure limiter added, wherein the rotation of the servomotor 28 is motion converted via the rotation transmission mechanism 30 and the ball screw mechanism 24 to move the screw 3 forward (Steps S23 and S24). In FIG. 5 (b), Vf indicates the rotation rate of the screw movement servomotor 28 in moving the screw 3 forward.

At the same time the screw 3 starts moving forward, the controller 32 starts timing and starts monitoring the rotation state (rotation detection) of the screw 3 by passive rotation. In this case, as shown in FIG. 4 (c), the molten resin in the screw head 3h side flows in reverse to the flight 3f side (in the direction of the arrow Fr) by the forward movement of the screw 3), and by this reverse flow the screw 3 rotates passively in reverse direction (in the direction of the arrow Rrs) of the forward rotation. Therefore, in this state, the resin pressure Ph in the screw head 3h side relative to the ring valve 2 becomes higher than the resin pressure Pf in the flight 3f side, wherein Pf<Ph.

Then, the ring valve 2 moves backward being pushed backward by the molten resin flowing in reverse, and stops at a position (touching position) where it is in contact with the valve seat 3r. Therefore, the ring valve 2 practically comes into a closed state in the touching position (See the position in FIG. 4 (d)). At this point of time, the reverse flow of the molten resin stops at the same time, and the passive rotation of the screw 3 also stops. Because the screw 3 has such behavior, the controller 32 monitors the rotation state of the screw 3, and if the rotation of the screw 3 stops, it immediately performs a control to stop the forward movement of the screw 3 (Steps S25, S26, and S27).

In this case, the rotation state and the stopped state of the screw 3 can be monitored by the controller 32 through encoder pulses Dp obtained from the rotary encoder 6 added to the servomotor 5. Specifically, if the number of pulses within a preset monitoring time becomes a specified number or the pulse output interval becomes a specified (time) interval, it can be judged to be in the stopped state. Therefore, the stopped state is a concept that includes not only a completely stopped state but also a state wherein the rate decreased below a specified rate. Then, when the stopped state of the screw 3 is detected, timing is reset at the same time (Step S28).

By performing such a screw forward movement process, the screw 3 can always be stopped precisely at the touching position wherein the ring valve 2 contacts with the valve seat 3r. In addition, because the touching position (stopped state) is detected through the encoder pulses Dp obtained from the rotary encoder 6, it has the advantage that it can be implemented easily and with a low cost by utilizing existing equipment without the necessity of a separate detector.

It is possible that an anomaly may occur by a part of the ring valve 2 tipping off or a foreign object being caught by the ring valve 2 during the forward movement of the screw 3. When such an anomaly occurs, the rotation of the screw 3 does not stop normally but continues idly. In the present embodiment, timing is started at the same time as the forward movement of the screw 3 starts, if the stopped state of the screw 3 cannot be detected even when a preset time (judging time) Ts is reached, a first error processing is performed (Steps S25 and S29). As the first error processing, a stop operation process or an alarming process can be performed, by which an operating anomaly of the ring valve 2 can be quickly detected, and measurements quickly taken relative to each operating anomaly.

Next, reverse rotation of the screw 3 is performed. The reverse rotation of the screw 3 may be performed immediately from the detection of said stopped state of the screw 3, or may be performed after a specific set time passed. In this case, the screw rotation servomotor 5 is driven (rate controlled) by the controller 32. By this, as shown in FIG. 4 (d), the screw 3 actively reverse rotates in the direction of an arrow Rr (Step S30). In FIG. 5 (a), Vr indicates the rotation rate of the servomotor 5 in the reverse rotation of the screw 3, and $\theta_s$ and $\theta_e$ indicate angles of the screw 3. While the amount of reverse rotation of the screw 3 can be arbitrarily set for every molding machine, it can be mostly set around ¼ rotation. In this case, ($\theta_e$-$\theta_s$) in FIG. 5 (a) can be set mostly around 90°. Also, at the time of the reverse rotation of the screw 3, the screw movement servomotor 28 is driven by the controller 32, and a position control to fix the displacement of the screw 3 is performed. By this, because the displacement of the screw 3 is fixed even if the screw 3 reverse rotates, it contributes to preventing further variation of the measured amount of resin and improving the measurement precision. In FIG. 5 (a), Xd indicates the screw position after the screw 3 was rotated in reverse (reverse rotation ending position).

The number of rotation (angle of rotation) or the rotation rate in reverse rotating the screw 3 can be displayed on a display 7 connected to the controller 32. By performing such a display, an operator can visually and easily grasp the operation state of the ring valve 2. Then, when the reverse rotation of the screw 3 reaches a set amount of reverse rotation (angle of rotation), a control to stop the rotation of the screw 3 is performed (Steps S31 and S32).

At the time of the reverse rotation of the screw 3, because the displacement of the screw 3 is fixed, as shown in FIG. 4 (d), a backward (in the direction of an arrow Fi) pressure to the molten resin is applied. In this case, immediately before reverse rotating the screw 3, because the resin pressure Ph in the screw head 3h side relative to the ring valve 2 is higher than the resin pressure Pf in the flight 3f side, namely, Pf<Ph, after the screw 3 is rotated in reverse, the resin pressure Ph in the screw head 3h side relative to the ring valve 2 becomes even higher than the resin pressure Pf in the flight 3f side, namely Pf<<Ph.

On the other hand, when the process of reverse rotating the screw 3 is finished, a suck-back process is performed, wherein the screw 3 is retracted by a preset stroke (such as about 1~2 mm) to release the pressure (Step S33). In the suck-back process, the servomotor 28 is driven (rate controlled) by the controller 32 to retract the screw 3. In this case, the retraction stroke of the screw 3 is preset so that the end of the retraction stroke becomes the suck-back ending position Xs, considering the position where the pressure release is complete. By this, when the screw 3 reaches the suck-back ending position Xs, the retraction of the screw 3 is stopped to end the suck-back process, and then proceed onto an injection process which is the next process. In FIG. 5, Vs indicates the rotation rate of the screw movement servomotor 28 in the suck-back process, and Xs the suck-back ending position, respectively, wherein this suck-back ending position Xs becomes an injection starting position. The suck-back process is a process wherein the screw 3 is retracted by a preset tiny stroke after a measurement is ended to release pressure, preventing a harmful effect due to the resin pressure when opening the mold, namely a so-called runny-nose phenomenon due to low-viscosity resin and a so-called cobwebbing phenomenon from a mold sprue due to high viscosity resin.

Shown in FIG. 4 (*e*) is the state of the screw 3 after performing such a suck-back process as this, wherein the resin pressure Ph in the screw head 3*h* side relative to the ring valve 2 is somewhat higher than or almost the same as the resin pressure Pf in the flight 3*f* side, namely Pf<Ph or Pf≈Ph. Because the ring valve 2 can be closed in a state where the resin pressure Ph forward (in the screw head 3*h* side) of the ring valve 2 is always higher than the resin pressure Pf backward (in the flight 3*f* side) before the suck-back process, even after the suck-back process, the harmful effect of the ring valve 2 opening again can be eliminated, stably closing the ring valve 2 before starting injection.

According to the above, the measurement process S1 ends, and next the injection process Si is performed. Here, in the measurement process S1, even if the post-measurement process Sb is performed, the state of the ring valve 2, namely whether the ring valve 2 is completely closed or not, is unclear. Therefore, in the period of the injection process, whether the ring valve 2 is completely closed or not is detected (Steps S6~S9). Note that the screw 3 is switched to a freely-rotatable state in the injection process, so that it can be passively rotated by an external force. In addition, torque limitation for the rotation of the screw 3 is performed by a torque limiter. By performing such torque limitation, safety based on the durability and behavior of the screw 3 and the ring valve 2 can be improved. Namely, in case the ring valve 2 is not closed, it may rotate at a high speed, and by limiting the rotation rate of the screw 3 by the torque limiter, damages to the screw 3 and the ring valve 2 can be prevented.

In the injection process Si, the screw movement servomotor 28 is driving controlled b the controller 32. By this, the screw 3 moves forward (Steps S3 and S4). In addition, the angle of rotation of the screw 2 since the start of the injection process Si is detected as the amount of rotation Rd (Steps S3 and S6). In this case, the amount of rotation Rd is detected from the encoder pulses Dp obtained from the rotary encoder 6 added to the screw rotation servomotor 5 which rotates the screw 3. By utilizing the rotary encoder 6, no separate detector becomes necessary, and thus it can be implemented easily and at low cost by utilizing existing equipment.

On the other hand, a set amount Rs is set in advance to the controller 32. In other words, a set amount (angle or rotation) for the angle of rotation (amount of rotation Rd) of the screw 3 for judging whether the ring valve is completely closed or not is set as a set amount Rs. In this case, the set amount Rs is selected from an angle range of 0.05~0.5°, more desirably about 0.1°. Selecting it from this angle range has the advantage of appropriately implementing the anomaly monitoring method relating to the present invention for various kinds of molding machines under various kinds of molding conditions.

Then, in the controller 32 a process of comparing the detected amount of rotation Rd and the set amount Rs is performed (Step S7). In doing so, if little amount of rotation Rd is detected and is the set amount Rs or smaller, the ring valve 2 is judged to be completely closed (Step S8). Conversely, if the amount of rotation Rd exceeds the set amount Rs, the closing of the ring valve 2 is judged to be incomplete, and an anomaly processing is performed (Step S9). In this case, a certain anomalous behavior due to the resin state is expected, and it is highly possible that at least the amount of filling the resin changed (decreased) due to the occurrence of a reverse flow. For this reason, the anomaly processing in this case is performed in the same way as a quality check process for molded products. Therefore, the molded product formed in this shot is processed as a defective product. By utilizing it for such a quality check process, it can contribute to facilitating the quality check process, and if it is used in combination with another quality check process, a more reliable quality check can be performed.

If the anomalous process wherein the closing of the ring valve 2 is judged to be incomplete continuously occurs three times or more (N times or more in general), a second error processing may be performed (Steps S10 and S11). In this case, an operation anomaly due to the ring valve 2 being damaged or catching a foreign object is considered possible, and a stop operation process and/or an alarming process are performed. By this, an operation anomaly of the ring valve 2 can be immediately detected, and measurements relative to the operation anomaly can be quickly taken. Then, when the screw 3 reaches a set injection time, the injection process Si ends (Step S5).

According to such an anomaly monitoring method relating to the present embodiment, because the amount of rotation Rd of the screw 3 since the start of the injection process Si is detected, and if the detected amount of rotation Rd exceeds the set amount Rs, an anomaly processing (Step S9) is performed, and whether the ring valve 2 is closed or not can be more directly detected, and a highly reliable and stable monitoring of whether the ring valve 2 is completely closed can be performed. In addition, because it requires no separate construction such as a communication means inside a screw and a position detection means in rear of the screw as in the conventional case, a large cost reduction relating to the parts cost and manufacturing cost can be achieved by facilitating the implementation and simplifying the structure, and it can also contribute to miniaturizing the whole molding machine.

While the best embodiment was explained in detail above, the present invention is not limited to such an embodiment, but it can be arbitrarily changed within a range that does not deviate from the spirit of the present invention in terms of the detailed construction, shape, quantity, numerical values, method, and so on, and it can also be added to or removed upon necessity.

For example, while a ring valve was shown as an example of the back-flow prevention valve 2, it is not necessarily limited to a ring valve. In addition, while the case of utilizing encoder pulses Dp obtained from the rotary encoder 6 was shown as a means for detecting the amount of rotation Rd of the screw 3, it is not meant to exclude any other detection method. Further, while the case of processing a molded product as a defective product in a quality check process when performing an anomaly processing, it may be replaced with another processing such as an alarming process or they may be combined. On the other hand, while the post-measurement process Sb included a process wherein after the end of the main measurement process Sa, the screw 3 is put in a freely-rotatable state and moved forward, the rotation state of the screw 3 during this forward movement is monitored, and when the rotation of the screw 3 is stopped, the screw 3 is rotated in reverse by a specified amount of reverse rotation, and further a suck-back process wherein the screw 3 is retracted by a specified stroke after rotating the screw 3 in reverse, it is arbitrary as to whether to include these processes.

What is claimed is:

1. An anomaly monitoring method of an injection molding machine which monitors anomaly in a measurement process, comprising:
   executing a main measurement process which performs a measurement by forward rotating a screw having a back-flow prevention valve installed on a tip of the screw;
   executing a post-measurement process which performs a post-measurement processing for closing said back-flow prevention valve after the main measurement process ends,
   executing an injection process wherein said screw is put in a freely-rotatable state and is moved forward after said post-measurement processing ends,
   detecting an amount of rotation of said screw since a start of the injection process, and
   if the detected amount of rotation exceeds at least a preset amount, executing an anomaly processing,
   wherein the back-flow prevention valve is mounted in a freely displaceable manner on a valve mounting axis unit which is located between a screw head and a flight side of the screw, an inner diameter of the back-flow prevention valve being larger than an outer diameter of the valve mounting axis unit,
   wherein during the injection process, the back-flow prevention valve is pressed against a flat, ring-shaped rear face of the screw head and
   wherein in said post-measurement process after said main measurement process ends, said screw is put in a freely-rotatable state and moved forward, a rotation state of said screw during the forward movement is monitored, and when the rotation of said screw stops, said screw is rotated in reverse by a specified amount of reverse rotation.

2. The anomaly monitoring method of an injection molding machine according to claim 1, wherein said amount of rotation is detected through encoder pulses obtained from a rotary encoder added to a screw rotation servomotor which rotates said screw.

3. The anomaly monitoring method of an injection molding machine according to claim 1, wherein said preset amount is selected from an angle range of 0.05° to about 0.5° in detecting said amount of rotation from the angle or rotation of said screw.

4. The anomaly monitoring method of an injection molding machine according to claim 1, wherein a molded product is processed as a defective product by a quality check process in said anomaly processing.

5. The anomaly monitoring method of an injection molding machine according to claim 1, wherein an error processing is performed when said anomaly processing continuously occurs N times or more.

6. The anomaly monitoring method of an injection molding machine according to claim 1, wherein said amount of reverse rotation is set approximately to ¼ rotation.

7. The anomaly monitoring method of an injection molding machine according to claim 1, wherein during said post-measurement process, said screw is put in a freely-rotatable state and moved forward, and when the rotation of said screw stops, the forward movement of the screw is immediately controlled to stop, after which said screw is rotated in reverse.

8. The anomaly monitoring method of an injection molding machine according to claim 1, wherein said stopped state includes a case where it is completely stopped and a case where it is slowed down to a specified rate or below.

9. The anomaly monitoring method of an injection molding machine according to claim 1, wherein a torque limitation is performed to the rotation of the screw by a torque limiter in said injection process.

10. The anomaly monitoring method of an injection molding machine according to claim 1, wherein said post-measurement process includes a suck-back process wherein said screw is retracted by a specified stroke after rotating said screw in reverse.

11. The anomaly monitoring method of an injection molding machine according to claim 1, wherein during said post-measurement process, timing is started at the same time the forward movement of said screw is started, if a stopped state of the screw is not detected even when a preset time is reached, a first error processing is performed.

12. The anomaly monitoring method of an injection molding machine according to claim 1, wherein a valve seat extends outwardly in a radial direction from the valve mounting axis unit at the flight side of the screw, and
   back-flow from the flight side to a screw head side is prevented when the back-flow prevention valve retracts and makes contact with the valve seat.

13. The anomaly monitoring method of an injection molding machine according to claim 1, wherein a valve seat extends outwardly in a radial direction from the valve mounting axis unit at the flight side of the screw, and
   back-flow from the flight side to a screw head side is enabled when the back-flow prevention valve is displaced away from the valve seat.

14. The anomaly monitoring method of an injection molding machine according to claim 1, wherein the back-flow prevention valve is cylindrically shaped, and has two flat ends that are parallel to each other.

15. The anomaly monitoring method of an injection molding machine according to claim 1, wherein the back-flow prevention valve has an outer diameter which is substantially equal to an outer diameter of the flat, ring-shaped rear face of the screw head.

16. An anomaly monitoring method of an injection molding machine characterized by the fact that, in an anomaly monitoring method of an injection molding machine which monitors anomaly in a measurement process comprising:
   executing a main measurement process which performs a measurement by forward rotating a screw having a back-flow prevention valve installed on a tip of the screw;
   executing a post-measurement process which performs a post-measurement processing for closing said back-flow prevention valve after this main measurement process ends,
   executing an injection process wherein said screw is put in a freely-rotatable state and moved forward after said post-measurement processing ends,
   detecting an amount of rotation of said screw since a start of the injection process, and
   if the detected amount of rotation exceeds at least a preset amount, executing an anomaly processing,
   wherein in said post-measurement process after said main measurement process ends, said screw is put in a freely-rotatable state and moved forward, a rotation state of said screw during a forward movement is monitored, and when the rotation of said screw stops, said screw is rotated in reverse by a specified amount of reverse rotation.

* * * * *